(12) United States Patent
Pillai et al.

(10) Patent No.: US 11,107,230 B2
(45) Date of Patent: Aug. 31, 2021

(54) SYSTEMS AND METHODS FOR DEPTH ESTIMATION USING MONOCULAR IMAGES

(71) Applicant: Toyota Research Institute, Inc., Los Altos, CA (US)

(72) Inventors: Sudeep Pillai, Boston, MA (US); Rares A. Ambrus, San Francisco, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 162 days.

(21) Appl. No.: 16/277,303

(22) Filed: Feb. 15, 2019

(65) Prior Publication Data

US 2020/0090359 A1 Mar. 19, 2020

Related U.S. Application Data

(60) Provisional application No. 62/731,763, filed on Sep. 14, 2018, provisional application No. 62/739,540, filed on Oct. 1, 2018.

(51) Int. Cl.
*G06T 7/593* (2017.01)
*G06T 7/73* (2017.01)
*G06K 9/00* (2006.01)

(52) U.S. Cl.
CPC .......... *G06T 7/593* (2017.01); *G06K 9/00805* (2013.01); *G06T 7/75* (2017.01);
(Continued)

(58) Field of Classification Search
CPC . G06T 7/593; G06T 7/75; G06T 2207/10012; G06T 2207/10028; G06T 2207/20081; G06K 9/00805
See application file for complete search history.

(56) References Cited

U.S. PATENT DOCUMENTS 8,284,998 B2  10/2012  Hu et al.
9,547,887 B2   1/2017  Liang et al.
(Continued)

OTHER PUBLICATIONS

"Unsupervised CNN for Single View Depth Estimation: Geometry to the Rescue", Garg et al. Jul. 29, 2016.*
(Continued)

*Primary Examiner* — Qun Shen
(74) *Attorney, Agent, or Firm* — Christopher G. Darrow; Darrow Mustafa PC

(57) ABSTRACT

System, methods, and other embodiments described herein relate to generating depth estimates from a monocular image. In one embodiment, a method includes, in response to receiving the monocular image, flipping, by a disparity model, the monocular image to generate a flipped image. The disparity model is a machine learning algorithm. The method includes analyzing, using the disparity model, the monocular image and the flipped image to generate disparity maps including a monocular disparity map corresponding to the monocular image and a flipped disparity map corresponding with the flipped image. The method includes generating, in the disparity model, a fused disparity map from the monocular disparity map and the flipped disparity map. The method includes providing the fused disparity map as the depth estimates of objects represented in the monocular image.

20 Claims, 6 Drawing Sheets

(52) U.S. Cl.
CPC ............... *G06T 2207/10012* (2013.01); *G06T 2207/10028* (2013.01); *G06T 2207/20081* (2013.01); *G06T 2207/20221* (2013.01); *G06T 2207/20228* (2013.01); *G06T 2207/30261* (2013.01)

(56) References Cited

U.S. PATENT DOCUMENTS

| | | | |
|---|---|---|---|
| 9,928,418 | B2 | 3/2018 | Segalovitz et al. |
| 2014/0035909 | A1* | 2/2014 | Abramoff ............... G06T 7/593 345/419 |
| 2014/0168362 | A1 | 6/2014 | Hannuksela ......... H04N 13/161 348/43 |
| 2015/0319419 | A1* | 11/2015 | Akin .................... H04N 13/207 348/49 |
| 2017/0142312 | A1* | 5/2017 | Dal Mutto ........... H04N 13/239 |
| 2017/0302910 | A1* | 10/2017 | Richards .............. H04N 13/239 |
| 2018/0139458 | A1 | 5/2018 | Wang et al. |
| 2018/0231871 | A1* | 8/2018 | Wang ................. G06K 9/00208 |
| 2018/0322646 | A1* | 11/2018 | Matthies ............... B64C 39/024 |
| 2019/0325597 | A1* | 10/2019 | Chakravarty ........ H04N 13/239 |

OTHER PUBLICATIONS

Ummenhofer et al., "Demon: Depth and motion network for learning monocular stereo," in IEEE Conference on computer vision and pattern recognition (CVPR), vol. 5, 2017, p. 6.
Wang, et al. "Learning depth from monocular videos using direct methods," in Proceedings of the IEEE Conference on Computer Vision and Pattern Recognition, 2018, pp. 2022-2030.
Kuznietsov et al., "Semi-supervised deep learning for monocular depth map prediction," in Proc. of the IEEE Conference on Computer Vision and Pattern Recognition, 2017, pp. 6647-6655.
Eigen et al., "Depth map prediction from a single image using a multi-scale deep network," in Advances in neural Information processing systems, 2014, pp. 2366-2374.
Garg et al., "Unsupervised cnn for single view depth estimation: Geometry to the rescue," in European Conference on Computer Vision. Springer, 2016, pp. 740-756.
Godard et al., "Unsupervised monocular depth estimation with left-right consistency," in CVPR vol. 2, No. 6, 2017, p. 7.
Zhou et al. "Unsupervised learning of depth and ego-motion from video," in CVPR, vol. 2, No. 6, 2017, p. 7.
Godard et al. "Digging into self-supervised monocular depth estimation," arXiv preprint arXiv:1806.01260, 2018.
Shi et al., "Real-time single image and video superresolution using an efficient sub-pixel convolutional neural network," In Proceedings of the IEEE Conference on Computer Vision and Pattern Recognition, 2016, pp. 1874-1883.
Jaderberg et al. Spatial transformer networks, in Advances in neural information processing systems, 2015, pp. 2017-2025.
Odena et al.,"Deconvolution and checkerboard artifacts," Distill, vol. 1, No. 10, p. e3, 2016.
Kingma et al., "Adam: A method for stochastic optimization," arXiv preprint arXiv:1412.6980, 2014.
Yin et al., "Geonet: Unsupervised learning of dense depth, optical flow and camera pose," in Proceedings of the IEEE Conference on Computer Vision and Pattern Recognition (CVPR), vol. 2, 2018.
Yang et al. "Deep virtual stereo odometry: Leveraging deep depth prediction for monocular direct sparse odometry," arXiv preprint arXiv:1807.02570, 2018.
Fu et al., "Deep ordinal regression network for monocular depth estimation," in Proceedings of the IEEE Conference on Computer Vision and Pattern Recognition, 2018, pp. 2002-2011.
Mahjourian et al., "Unsupervised learning of depth and ego-motion from monocular video using 3d geometric constraints," in Proceedings of the IEEE Conference on Computer Vision and Pattern Recognition, 2018, pp. 5667-5675.
Bloesch et al., "Codeslam-learning a compact, optimisable representation for dense visual slam," 2018.
Zhou et al."DeepTAM: Deep Tracking and Mapping," arXiv preprint arXiv:1808.01900, 2018.
Saxena et al., "Make3d: Learning 3d scene structure from a single still image," IEEE transactions on pattern analysis and machine intelligence, vol. 31, No. 5, pp. 824-840, 2009.
Mayer et al., "A large dataset to train convolutional networks for disparity, optical flow, and scene flow estimation," in Proceedings of the IEEE Conference on Computer Vision and Pattern Recognition, 2016, pp. 4040-4048.
Zbontar et al., "Computing the stereo matching cost with a convolutional neural network," in Proc. IEEE Conf. on Computer Vision and Pattern Recognition (CVPR), 2015.
Kendall et al. "End-to-end learning of geometry and context for deep stereo regression," CoRR, vol. abs/1703.04309, 2017.
Mayer et al., "What Makes Good Synthetic Training Data for Learning Disparity and Optical Flow Estimation?" IJCV, 2018.
Meister et al., "Unflow: Unsupervised learning of optical flow with a bidirectional census loss," arXiv preprint arXiv:1711.07837,2017.
Li et al., "Undeepvo: Monocular visual odometry through unsupervised deep learning," arXiv preprint arXiv:1709.06841, 2017.
Zhou, et al. "View synthesis by appearance flow," in European conference on computer vision. Springer, 2016, pp. 286-301.
Flynn et al., "Deepstereo: Learning to predict new views from the world's imagery," in Proceedings of the IEEE Conference on Computer Vision and Pattern Recognition, 2016, pp. 5515-5524.
Fei et al. "Geo-supervised visual depth prediction," arXiv preprint arXiv:1807.11130, 2018.
Long et al. "Fully convolutional networks for semantic segmentation," in Proceedings of the IEEE conference on computer vision and pattern recognition, 2015, pp. 3431-3440.
Wang et al., "Image quality assessment: from error visibility to structural similarity," IEEE transactions on image processing, vol. 13, No. 4, pp. 600-612, 2004.
Geiger et al., "Vision meets robotics: The kitti dataset," The International Journal of Robotics Research, vol. 32, No. 11, pp. 1231-1237, 2013.
Cordts et al. "The cityscapes dataset for semantic urban scene understanding," in Proceedings of the IEEE conference on computer vision and pattern recognition, 2016, pp. 3213-3223.
Guo et al. "Learning monocular depth by distilling cross-domain stereo networks," in Proceedings of the European Conference on Computer Vision (ECCV), 2018, pp. 484-500.
He et al. "Deep residual learning for image recognition," in Proceedings of the IEEE conference on computer vision and pattern recognition, 2016, pp. 770-778.
Brahmbhatt et al., "Geometry-aware learning of maps for camera localization," in Proceedings of the IEEE Conference on Computer Vision and Pattern Recognition, 2018, pp. 2616-2625.
Clark et al., "Vinet: Visual-inertial odometry as a sequence-to-sequence learning problem." in AAAI, 2017, pp. 3995-4001.
Grassia, "Practical parameterization of rotations using the exponential map," Journal of graphics tools, vol. 3, No. 3, pp. 29-48, 1998.
Kendall et al., "Posenet: A convolutional network for real-time 6-dof camera relocalization," in Proceedings of the IEEE International conference on computer vision, 2015, pp. 2938-2946.
Mur-Artal et al., "Orb-slam2: An open-source slam system for monocular, stereo, and rgb-d cameras," IEEE Transactions on Robotics, vol. 33, No. 5, pp. 1255-1262, 2017.

\* cited by examiner

SYSTEMS AND METHODS FOR DEPTH ESTIMATION USING MONOCULAR IMAGES

CROSS-REFERENCE TO RELATED APPLICATIONS

This application claims benefit of U.S. Provisional Application No. 62/731,763, filed on, Sep. 14, 2018, and U.S. Provisional Application No. 62/739,540, filed on, Oct. 1, 2018, which are herein incorporated by reference in their entirety.

TECHNICAL FIELD

The subject matter described herein relates, in general, to systems and methods for determining the depth of a scene from a monocular image, and, more particularly, to using a self-supervised approach to depth estimation that includes using a differentiable flip-augmentation layer to improve estimates.

BACKGROUND

In order to operate effectively, robots (e.g., autonomous vehicles) use onboard sensors that facilitate perceiving obstacles and additional aspects of a surrounding environment. Thus, a robot uses information from the sensors to develop awareness of the surrounding environment in order to navigate through the environment and avoid collisions and other hazards. In particular, the robot uses the perceived information to simultaneously infer a 3-D structure of the environment and estimate ego-motion through the environment to provide for autonomous operation.

In general, further developing awareness of the robot about a surrounding environment facilitates avoiding hazards and operating autonomously. In particular, the ability to perceive distances through estimation of depth using the sensor data provides the robot with the ability to plan/estimate ego-motion through the environment. However, depending on the available onboard sensors, the robot may acquire a limited perspective of the environment, and, thus, encounter difficulties in distinguishing aspects of the environment.

That is, various sensors perceive different aspects of the environment differently and also have different implementation characteristics. For example, LiDAR is effective at perceiving depth in the surrounding environment but suffers from difficulties such as high costs and can encounter errors in certain weather conditions. Moreover, other sensors, such as stereo cameras, function to effectively capture depth information but also suffer from difficulties with cost, limited field-of-view, and so on. Additionally, while monocular cameras can be a cost-effective approach, the sensor data produced by such cameras does not explicitly include depth information. Instead, the robot implements processing routines that derive depth information from the monocular images.

However, leveraging monocular images to perceive depth can also suffer from difficulties such as depth ambiguities, limited resolution, image artifacts, difficulties with training the processing routines (e.g., expensive or limited availability data), and so on. In any case, the robot may encounter difficulties when perceiving aspects of the surrounding environment because of the noted issues and as a result may not develop a comprehensive awareness of the surrounding environment thereby resulting in difficulties performing various tasks such as navigation.

SUMMARY

In one embodiment, example systems and methods relate to an improved approach for processing monocular images to estimate depths in a surrounding environment. As previously noted, perceiving aspects of the surrounding environment can represent different challenges depending on which sensors are employed. Therefore, in one embodiment, a depth system is disclosed that improves the processing of monocular images to resolve depth estimates by implementing a self-supervised, super-resolved, differentiable flip network architecture. In particular, the depth system implements a disparity model embodying the noted network architecture. Thus, the disparity model integrates a differentiable flip augmentation layer into the network architecture that results in processing the monocular image twice. That is, the depth system uses the disparity model to process the monocular image in an original form and a horizontally flipped form. The disparity model fuses disparity maps (i.e., depth estimates) resulting from the processing of the two images together in order to form a fused disparity map that avoids artifacts along boundaries of the map, which may be present if the disparity model provided a disparity map from just a single monocular image.

Additionally, in one embodiment, the depth system further improves the derivation of disparity maps by implementing the disparity model to include subpixel-convolutional layers. The subpixel convolutional layers super-resolve disparities from lower-resolution intermediates to improve the resolution of the resulting disparity maps such that aspects of the surrounding environment are more precisely resolved in depth. Moreover, because the depth system integrates the differentiable flip layer and the subpixel-convolutional layers within the disparity model, the depth system trains the respective layers along with the disparity model overall thereby improving performance. In this way, the depth system improves depth estimates by avoiding the noted difficulties and implementing the disparity model in a robust manner to better handle aberrations and generate high-resolution outputs.

In one embodiment, a depth system for generating depth estimates from a monocular image is disclosed. The depth system includes one or more processors and a memory communicably coupled to the one or more processors. The memory stores a disparity module including instructions that when executed by the one or more processors cause the one or more processors to flip, using a disparity model, the monocular image to generate a flipped image. The disparity model is a machine learning algorithm. The disparity module includes instructions to analyze, using the disparity model, the monocular image and the flipped image to generate disparity maps including a monocular map corresponding to the monocular image and a flipped map corresponding with the flipped image. The disparity module includes instructions to generate, in the disparity model, a fused disparity map from the monocular map and the flipped map. The memory further stores an image module including instructions that when executed by the one or more processors cause the one or more processors to provide the fused disparity map as the depth estimates of objects represented in the monocular image.

In one embodiment, a non-transitory computer-readable medium for generating depth estimates from a monocular image and including instructions that when executed by one or more processors cause the one or more processors to perform one or more functions is disclosed. The instructions include instructions to flip, using a disparity model, the monocular image to generate a flipped image, wherein the disparity model is a machine learning algorithm. The instructions include instructions to analyze, using the disparity model, the monocular image and the flipped image to generate disparity maps including a monocular map corresponding to the monocular image and a flipped map corresponding with the flipped image. The instructions include instructions to generate, using the disparity model, a fused disparity map from the monocular map and the flipped map. The instructions include instructions to provide the fused disparity map as the depth estimates of objects represented in the monocular image.

In one embodiment, a method for generating depth estimates from a monocular image is disclosed. In one embodiment, the method includes, in response to receiving the monocular image, flipping, by a disparity model, the monocular image to generate a flipped image. The disparity model is a machine learning algorithm. The method includes analyzing, using the disparity model, the monocular image and the flipped image to generate disparity maps including a monocular map corresponding to the monocular image and a flipped map corresponding with the flipped image. The method includes generating, in the disparity model, a fused disparity map from the monocular map and the flipped map. The method includes providing the fused disparity map as the depth estimates of objects represented in the monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
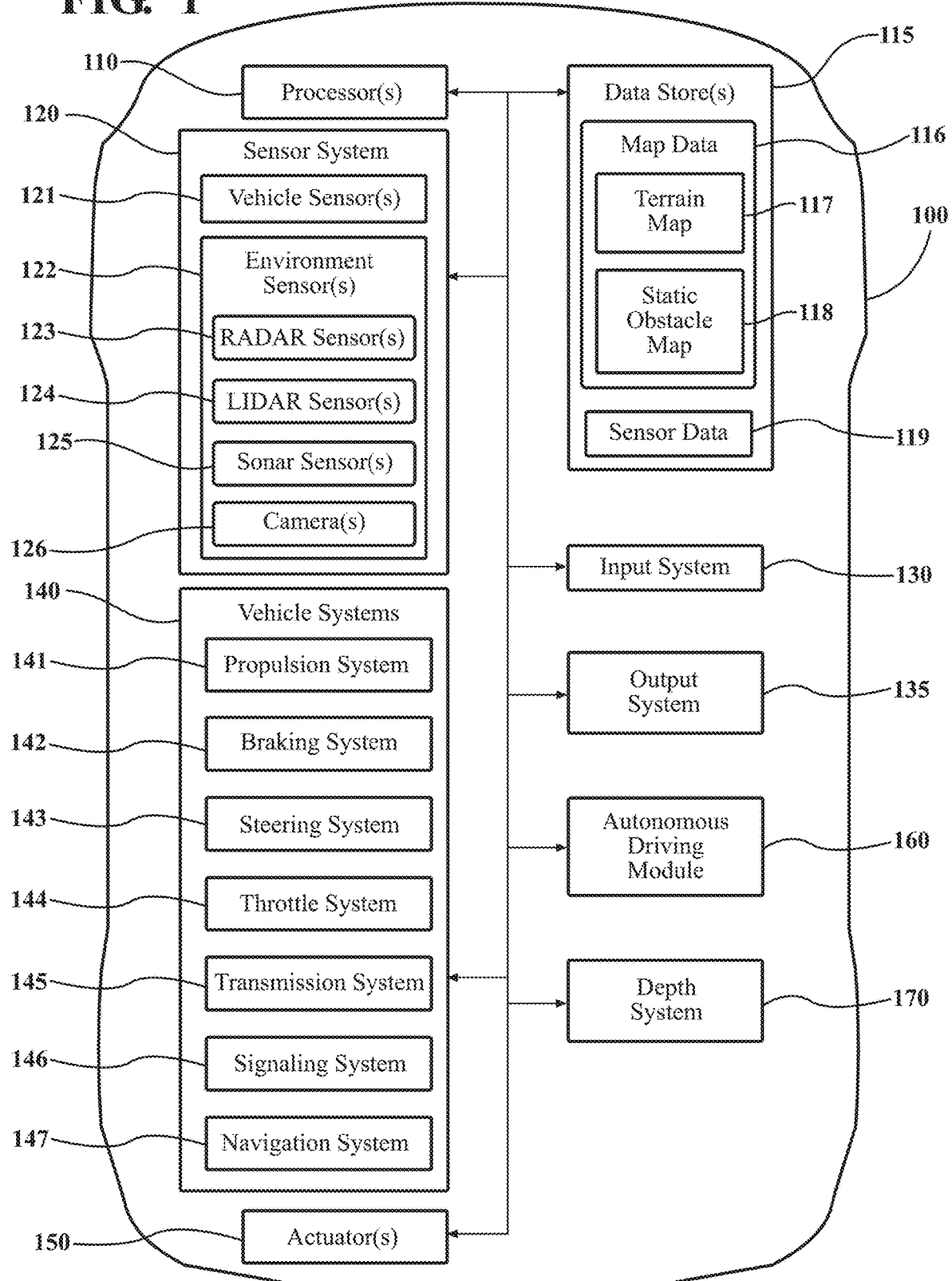
FIG. 1 illustrates one embodiment of a vehicle within which systems and methods disclosed herein may be implemented.

Systems, methods, and other embodiments associated with an improved approach to processing monocular images to estimate depths are disclosed herein. As previously noted, perceiving aspects of the surrounding environment can represent different challenges depending on which sensors are employed to support the endeavor. In particular, difficulties with using monocular cameras to perceive depths of objects in the surrounding environment can complicate the use of such sensors. That is, because a system trains and implements additional routines to derive the depth data from monocular images, difficulties can arise in relation to acquiring reliable training data, aberrations in the derived depth data from characteristics of the processing approach (e.g., edge artifacts, low-resolution), and so on. The difficulties can cause the depth estimates to be unreliable for resolving aspects of the environment thereby causing a device (e.g., autonomous vehicle) to rely on fallback measures to adequately navigate (e.g., handoff control to a driver).

Therefore, in one embodiment, a depth system is disclosed that improves the processing of monocular images to resolve depth estimates by implementing a machine learning algorithm with a unique network architecture that overcomes the noted difficulties. In particular, the depth system implements a disparity model that, for example, employs a differentiable flip augmentation layer to reduce visual artifacts, sub-pixel convolutional layers to accurately resolve high-resolution disparities, and a self-supervised training process that avoids the need for pre-labeled data sets/ground truth data.

More particularly, the disparity model integrates a differentiable flip augmentation layer and sub-pixel convolutional layers into the network architecture such that the separate layers are trained along with the model, and, thus, are fine-tuned to better identify the disparities. Consider that the disparity model, in one embodiment, includes a single disparity channel for processing a monocular image into a disparity map (i.e., depth estimates). Thus, the disparity model integrates a differentiable flip-augmentation layer (flip layer) that functions to improve resulting disparity maps by avoiding artifacts at the image boundary. In one approach, the flip layer generates a matching image to an input monocular image that is flipped horizontally (i.e., pixels swapped about a vertical centerline). The disparity model then separately processes the monocular image and the flipped image to generate separate disparity maps, which the disparity model fuses to provide a single disparity map as an output. As such, the flip layer causes the disparity model to process two separate images for each monocular image, which improves a final disparity map by avoiding the boundary artifacts.

Further, consider that the disparity model provides an output in the form of a disparity map that embodies the depth estimates for corresponding aspects of the monocular image. However, in various approaches, the disparity model may provide the disparity map in a lower resolution than the original monocular image. This can be due to various reasons but generally introduces difficulties with resolving depths for smaller/less detailed objects in the monocular image. Accordingly, the disparity model implements sub-pixel convolutional layers (sub-pixel layers) that super resolve a high-resolution version of output disparity maps. In general, the sub-pixel layers super-resolve disparities from lower-resolution intermediate outputs to improve the resolution in, for example, a layer-by-layer approach. Thus, the sub-pixel layers learn relevant low-resolution convolutional features in order to synthesize the disparity map in a target resolution (e.g., a resolution of the monocular image). In this way, the disparity model uses the flip layer and the sub-pixel layers integrated therein to provide disparity maps with improved resolution and clarity.

Moreover, because the depth system integrates the differentiable flip layer and the subpixel-convolutional layers within the disparity model, the depth system trains the respective layers along with the disparity model overall, thereby improving performance. That is, the depth system undertakes a self-supervised training process that avoids the need for pre-labeled training data by instead using pairs of stereo images to train the disparity model. Briefly, the depth system provides one image of the pair (e.g., left monocular image) to the disparity model and uses a resulting disparity map from the disparity model to synthesize the other image of the pair (e.g., right monocular image). Thus, using the synthesized image (e.g., synthetic right image) and the original corresponding monocular image (e.g., original right image), the depth system can assess an error/loss of the disparity model in producing the disparity map and adjust the hyper-parameters according thereto without using expensive pre-labeled/ground truth training data. In this way, the depth system improves depth estimates by implementing the noted improvements in the disparity model itself and while also improving the training process for the disparity model thereby improving the derivation of depth estimates from monocular images.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, proceeds through an environment according to assessed aspects of the environment, and thus benefits from the functionality discussed herein. Moreover, in further approaches, the noted systems (e.g., system 170) and methods can be implemented independently of a mobile platform such as a vehicle and thus may be statically mounted.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to process monocular images and provide depth estimates for the surrounding environment (e.g., objects, surfaces, etc.) depicted therein. Moreover, while depicted as a standalone component, in one or more embodiments, the depth system 170 is integrated with the autonomous driving module 160, the camera 126, or another component of the vehicle 100. The noted functions and methods will become more apparent with a further discussion of the figures.

Figure 2:
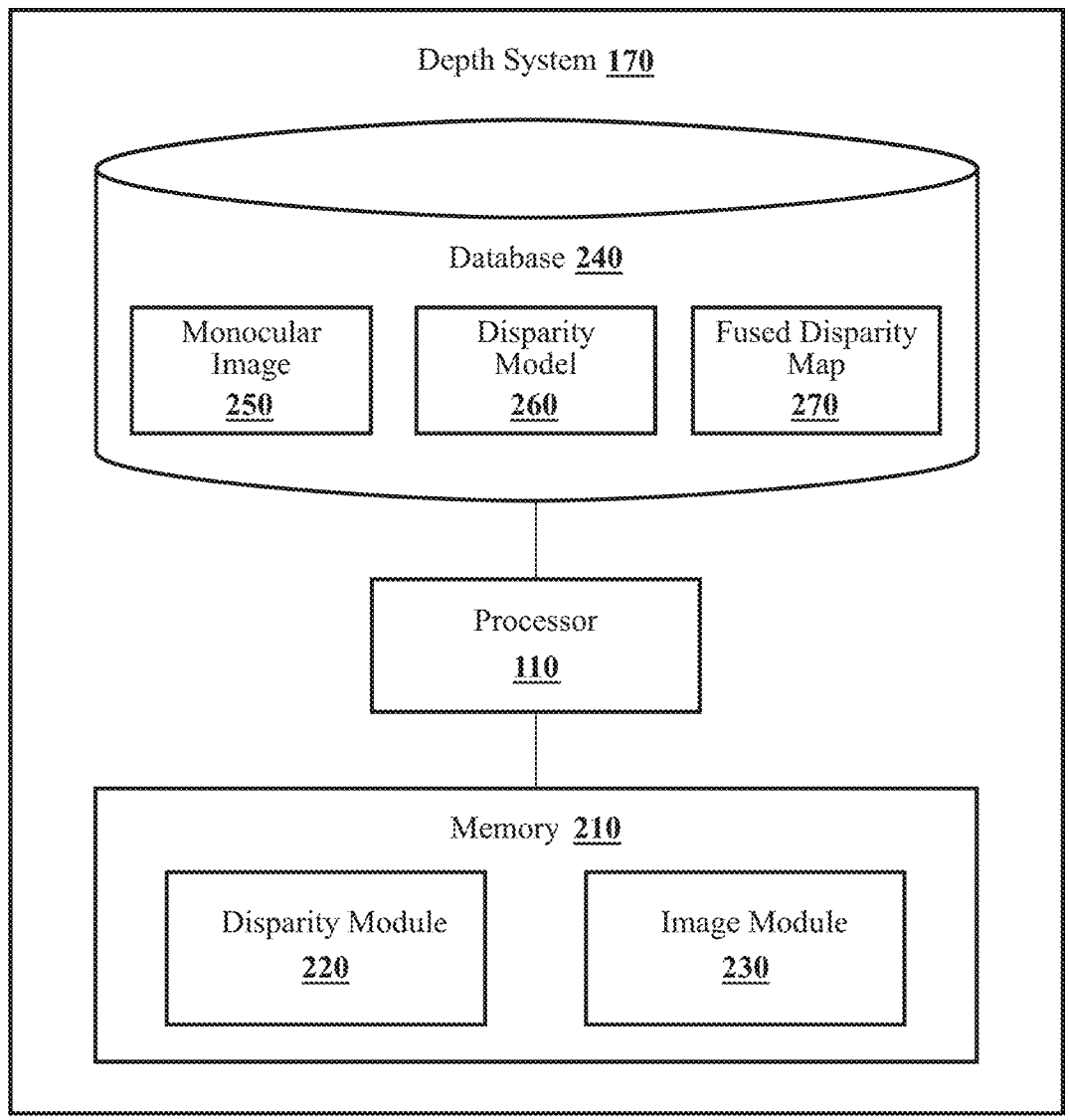
FIG. 2 illustrates one embodiment of a depth system that is associated with using monocular images to estimate depth in a surrounding environment.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application specific integrated circuit that is configured to implement functions associated with a disparity module 220 and an image module 230. In general, the processor 110 is an electronic processor such as a microprocessor that is capable of performing various functions as described herein. In one embodiment, the depth system 170 includes a memory 210 that stores the disparity module 220 and the image module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the depth system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes monocular image(s) 250, a disparity model 260, and a fused disparity map(s) 270 along with, for example, other information that is used by the modules 220 and 230.

The monocular image 250 is, for example, an image from the camera 126 that encompasses a field-of-view about the vehicle 100 of at least a portion of the surrounding environment. That is, the image 250 is, in one approach, generally limited to a subregion of the surrounding 360 environment. As such, the image 250 may be of a forward facing (i.e., direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In either case, the image 250 itself includes visual data of the FOV that is encoded according to an image standard (e.g., codec) associated with the camera 126. In general, characteristics of the camera 126 and the image standard define a format of the image 250. Thus, while the particular characteristics can vary according to different implementations, in general, the image 250 has a defined resolution (i.e., height and width in pixels) and format. Thus, for example, the monocular image 250 is generally an RGB visible light image. In further aspects, the image 250 can be an infrared image associated with a corresponding infrared camera, a black/white image, or other suitable format as may be desired. Whichever format that the depth system 170 implements, the image 250 is a monocular image in that there is no explicit additional modality indicating depth. In contrast to a stereo image that may integrate left and right images from separate cameras mounted side-by-side, the monocular image 250 does not include explicit depth information such as disparity maps derived from comparing the stereo images pixel-by-pixel.

Instead, the monocular image 250 implicitly provides depth information in the relationships of perspective and size of aspects depicted in the image 250 from which the disparity module 220 derives the disparity map 270 by using the disparity model 260. Thus, with reference to FIG. 3, one embodiment of the disparity model 260 is illustrated. In particular, the illustrated form of the model 260 identifies an exemplary flow of the single disparity channel formed by the model 260 for processing monocular images such as image 250.

Figure 3:
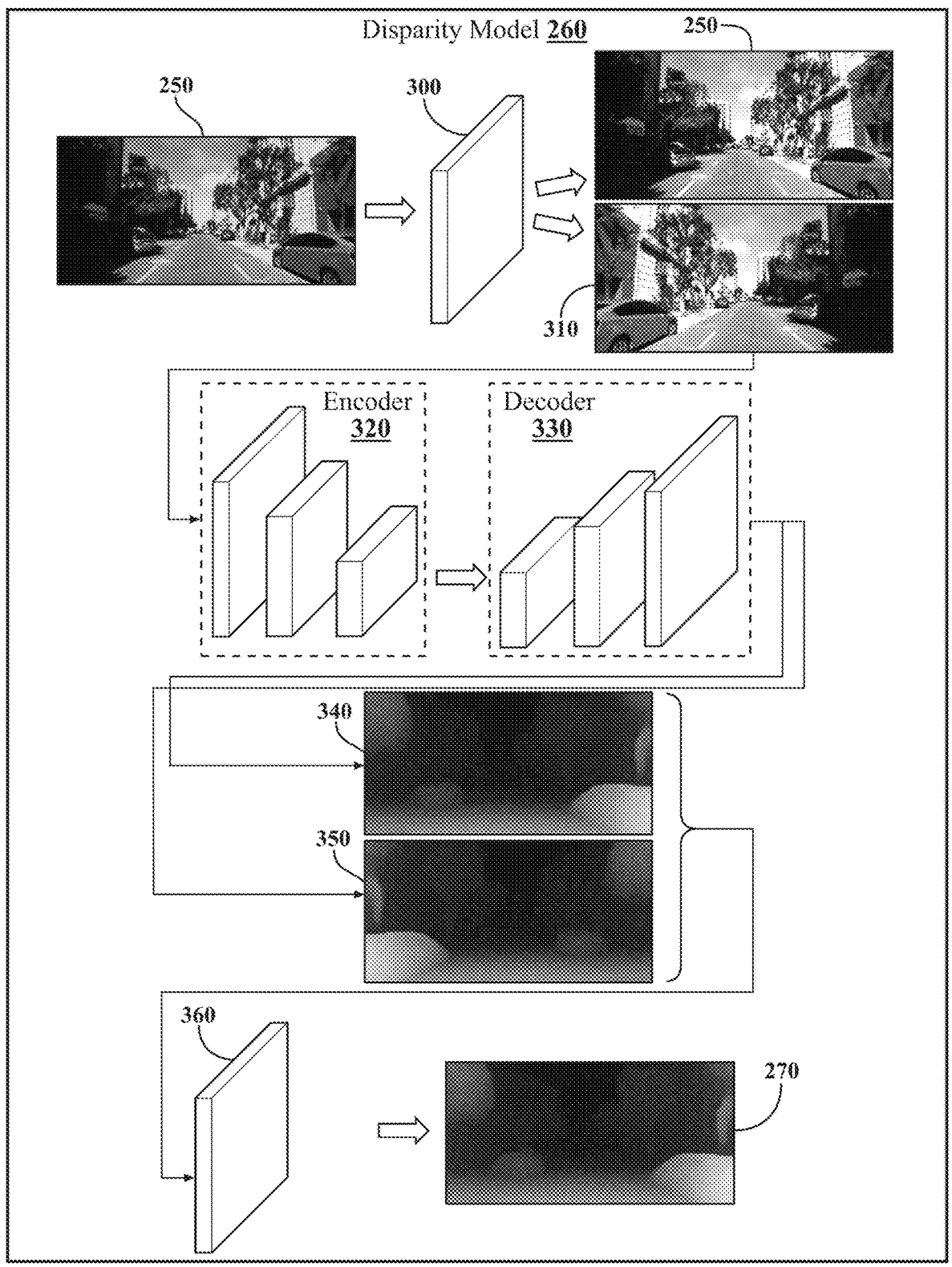
FIG. 3 illustrates one embodiment of a disparity model as may be employed by the depth system of FIG. 2.

The monocular image 250 is provided as an input into the disparity model 260. The disparity model 260, in one embodiment, may perform one or more pre-processing adjustments (e.g., brightness, contrast, color, etc.) to the image 250 prior to beginning processing with the differentiable flip layer 300. The differentiable flip layer 300 accepts the image 250 as an electronic input and generates a flipped image 310. The flipped image 310 is a mirror image of the monocular image 250 that the disparity model 260 produces by flipping pixels of the monocular image 250 about a vertical centerline that bisects the image 250. Thus, as shown in FIG. 3, features in the flipped image 310 are swapped to an opposite side of the flipped image 310 in comparison to the monocular image 250.

The disparity model 260 continues with processing the flipped image 310 and the monocular image 250 through, in one embodiment, an encoder 320 and a decoder 330. The encoder/decoder combination forms the single disparity channel of the disparity model 260. That is, the disparity model 260 has a single forward pass processing path and, thus, processes one of the images at a time. Accordingly, while illustrated together, the disparity model 260 processes the images 250 and 310 separately to produce separate disparity maps that are then fused together as discussed subsequently.

Moreover, the disparity model 260 processes monocular images to estimate disparity maps that correspond with aspects depicted in the images. As used herein, disparity maps correspond with/define depths of perceived objects in the monocular images. While the disparity maps provide depth information, they are in fact predicted differences or offsets between pixels of a theoretical pair of stereo images. That is, if a matching stereo image existed for the monocular image 250, the resulting fused disparity map 270 would correspond with differences in positions of objects on a pixel-wise basis between the two images as realized according to parallax between two cameras theoretically producing the images.

In either case, the encoder 320 is, in one embodiment, a convolutional neural network (CNN) or other machine learning algorithm. The encoder 320 includes, in one approach, convolutional layers, pooling layers, rectified linear units (ReLU), and/or other functional blocks that separately process the monocular image 250 and the flipped image 310 according to a learned prior. Once generated in the encoder 320, low-resolution representations of the disparity maps are fed into the decoder 330. In one embodiment, the decoder 330 is simply an extension of the CNN that comprises the encoder 320. Alternatively, in one approach, the decoder 330 is a generative neural network that accepts the low-resolution representations and super-resolves output disparity maps at a target resolution of the original monocular image. For example, the decoder 330 is a convolutional neural network (CNN) based approach for single-image-super-resolution (SISR) that implements sub-pixel convolutional layers to synthesize intermediate representations of the disparity map at successively higher resolutions. In particular, in one approach, the decoder 330 is comprised of four consecutive two-dimensional convolutional layers with 32, 32, 32, 16 layers with 1-pixel stride, each followed by ReLU activations and a final convolutional output layer that remaps to the target depth resolution using a pixel re-arrange operation. Thus, the decoder 330 provides a disparity map resulting from each separate analysis of the monocular image 250 and the flipped image 310. As shown in FIG. 3, a disparity map 340 corresponds to the monocular image 250 while flipped disparity map 350 corresponds to the flipped image 310.

However, because the flipped map 350 includes disparities that are also flipped in relation to the disparity map 340, the disparity model 260 first implements processing of an additional layer 360 that reverts the flipped disparity map 350 and then fuses the separate disparity maps 340 and 350 together in a differentiable manner with a pixel-wise mean operation to produce the fused map 270 that indicates metrically accurate relative distances of the represented objects from a point of reference of a camera that generated the monocular image. In this way, the depth system 170 avoids boundary artifacts in the fused disparity map 270 and thereby improves the depth estimates.

Figure 4:
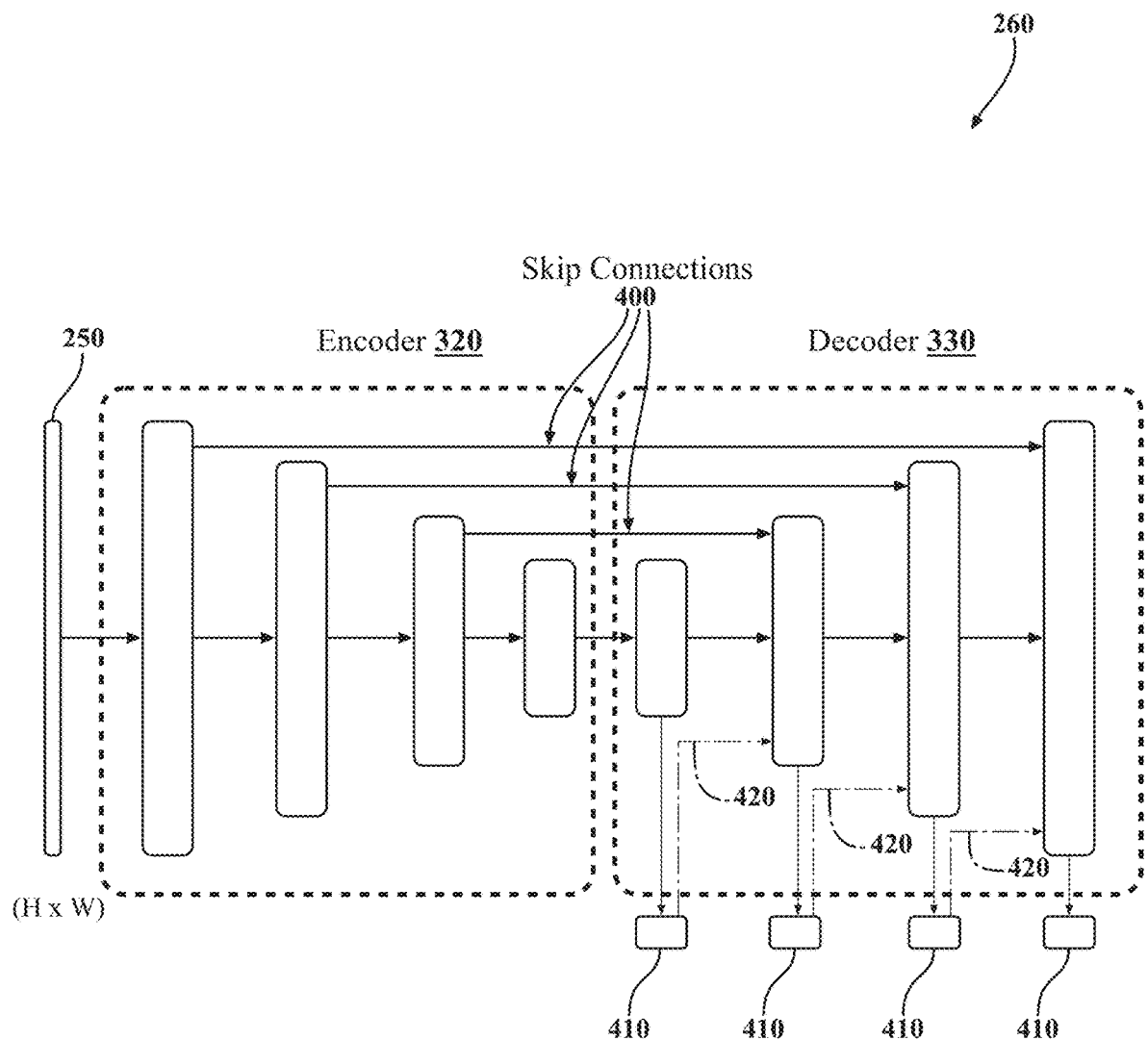
FIG. 4 illustrates a diagram of one embodiment of an encoder/decoder configuration of a disparity model for estimating depth from monocular images.

As further explanation, briefly consider FIG. 4, which illustrates further detail of the disparity model 260, and, in particular, the decoder 330. As an initial note about FIG. 4, the disparity model 260 includes skip connections 400 between activation blocks of the encoder 320 and the decoder 330 that facilitate resolving higher resolution details. Intermediate disparity map outputs 410 having successively improved resolutions are shown along with sub-pixel convolutional layers 420 that combine with convolutional or up-convolutional layers to synthesize successively higher resolution outputs until reaching the target resolution (i.e., H×W). In one approach, the decoder 330 includes $n_{L-1}$ up-scaling filters where L is number of layers in the network. Moreover, the decoder 330 learns super-resolution processing embodied in the filters of the sub-convolutional layers instead of plainly interpolating the high-resolution form of the disparity map. In this way, the decoder 330 is able to provide improved detail in the disparity map 270 provided at the target resolution.

As an additional note, while the disparity model 260 in FIGS. 3 and 4 is shown as a discrete unit separate from the depth system 170, the disparity model 260 is, for example, generally integrated with the disparity module 220. That is, the disparity module 220 functions to execute various processes of the disparity model 260. Accordingly, in one embodiment, the disparity module 220 includes instructions that function to control the processor 110 to generate the fused disparity map 270 using the disparity model 260.

Moreover, with further reference to FIG. 2, in one embodiment, the image module 230 generally includes instructions that function to control the processor 110 to execute various actions in support of the disparity module 220. For example, in one embodiment, the image module 230 receives the monocular image 250 from the camera 126 and provides the image 250 to the disparity module 220. The image module 230, in one or more approaches, receives the image 250 by controlling the camera 126 to capture the image 250, by passively acquiring the image 250 from a data bus or electronic memory, and so on. The image module 230 may also perform pre-processing on the image 250 to provide the image 250 in a format that is accepted by the model 260.

In further approaches, the image module 230 handles outputs from the disparity module 220/model 260. That is, the image module 230 includes instructions to, for example, perform one or more post-processing routines, provide the disparity map 270 to additional systems/modules in the vehicle 100 in order to control operation of the modules and/or the vehicle 100 overall, and so on. In still further aspects, the image module 230 communicates the disparity map 270 to a remote system (e.g., cloud-based system) as, for example, a mechanism for mapping the surrounding environment or for other purposes (e.g., traffic reporting, etc.). As one example, the image module 230 uses the disparity map 270 to map locations of obstacles in the surrounding environment and plan a trajectory that safely navigates the obstacles. Thus, the image module 230, in one embodiment, uses the disparity map 270 to control the vehicle 100 to navigate through the surrounding environment.

Furthermore, in one embodiment, the image module 230 includes instructions to train the disparity model 260. As discussed previously, the image module 230, in one embodiment, trains the disparity model 260 using a self-supervised process. Thus, to initiate the disparity model 260, the image module 230 uses pairs of stereo images and formulates the generation of the disparity map 270 as a photometric error minimization across the stereo images. In one embodiment, the image module 230 trains the disparity model 260 by causing the disparity module 220 to execute as though typical operation is underway, however, the image module 230 provides one of the images from a stereo pair as the monocular image 250 for processing. As such, image module 230 uses the resulting depth map and the input monocular image 270 to synthesize the matching image of the stereo pair. The image module 230 can then compare the synthesized image and the actual matching image from the original stereo pair to determine an error, which is embodied as, for example, the photometric loss. This loss characterizes an accuracy of the disparity model 260 in producing the map 270, and, thus, the image module 230 adjusts the model 260 according to the loss.

The image module 230 implements a loss function $_D$ in order to assess the error. For example, consider that $D_t$ is the disparity image (i.e., disparity map 270) for the corresponding target image $I_t$, where $I_x$ is a synthetic image. The image module 230 incorporates, in one embodiment, a photometric error as the minimization of pixel-intensity difference between the target image $I_t$ and the synthesized target image re-projected from the source image's view $\hat{I}_t = I_s(p_s)$. $p_s \sim K x_{t \to s} \hat{D}_t(p_t) K^{-1} p_t$ is the source pixel derived from re-projecting the target pixel $p_t$ in a view of the source image $x_s$, with K being the intrinsic parameter from the camera, $D_t$ is the estimated disparity image for the target frame $I_t$ (i.e., the quantity which is being estimated given the loss with $x_{t \to s}$ describing the relative 6 degree-of-freedom transformation between the target image view pose $x_t$ and the source image view pose $x_s$. The disparity estimation model 260 represented as $f_d$ parameterized by $\theta_d$ is shown in equation (1).

$$\hat{\theta}_D = \operatorname{argmin} \sum_{s \in S} D(I_t, \hat{I}_t; \theta_D) \quad (1)$$

where $s \in S$ are all disparate views available for synthesizing the target image $I_t$. In the case of stereo cameras $x_{s \to t}$ in equation (1) is known a-priori, and directly incorporated as a constant within the overall minimization objective. The overall loss $_D$ is comprised of 3 terms as shown in equation (2)

$$_D(I_t, \hat{I}_t) = _p(I_t, \hat{I}_t) + \lambda_1 \, _s(I_t) + \lambda^2 \, _O(I_t) \quad (2)$$

$_p$ represents the appearance matching loss and is implemented according to pixel-level similarity between the target image and the synthesized image using a structural similarity (SSIM) term combined with a photometric loss term. $_s$ represents the disparity smoothness loss and is implemented to regularize disparities in textureless low-image gradient regions. $_O$ represents the occlusion regularization loss and is implemented to minimize shadow areas in the disparity map.

Thus, the image module 230 trains the disparity model 260 according to the above-identified minimization objective from equation (1). In general, the image module 230 trains the model 260 over a training data set of stereo image pairs that includes a plurality of separate pairs (e.g., 20,000). Through the process of training the model 260, the image module 230 adjusts various hyper-parameters in the model 260 to fine-tune the functional blocks included therein. Accordingly, the image module 230 trains the differentiable flip-augmentation layer 300 along with the sub-pixel convolutional blocks of the decoder 330. In this way, the flipping and super-resolving of the disparity map are integrated with the disparity model and the training process to improve overall functioning (e.g., resolving artifacts and increasing resolution).

Moreover, the image module 230, in one approach, further implements a generative neural network to synthesize the matching stereo image from the disparity map 270. In various approaches, the generative network can be integrated as part of the disparity model 260 or implemented in a standalone configuration. In either case, the image module 230 trains the model 260 in a self-supervised approach through the use of pairs of stereo images.

Through this training process, the model 260 develops a learned prior of the monocular images as embodied by the internal parameters of the model 260 from the training on the stereo images. In general, the model 260 develops the learned understanding about how depth relates to various aspects of an image according to, for example, size, perspective, and so on. Consequently, the resulting trained disparity model 260 is leveraged by the depth system 170 to estimate depths from monocular images that do not include an explicit modality identifying the depths.

Figure 5:
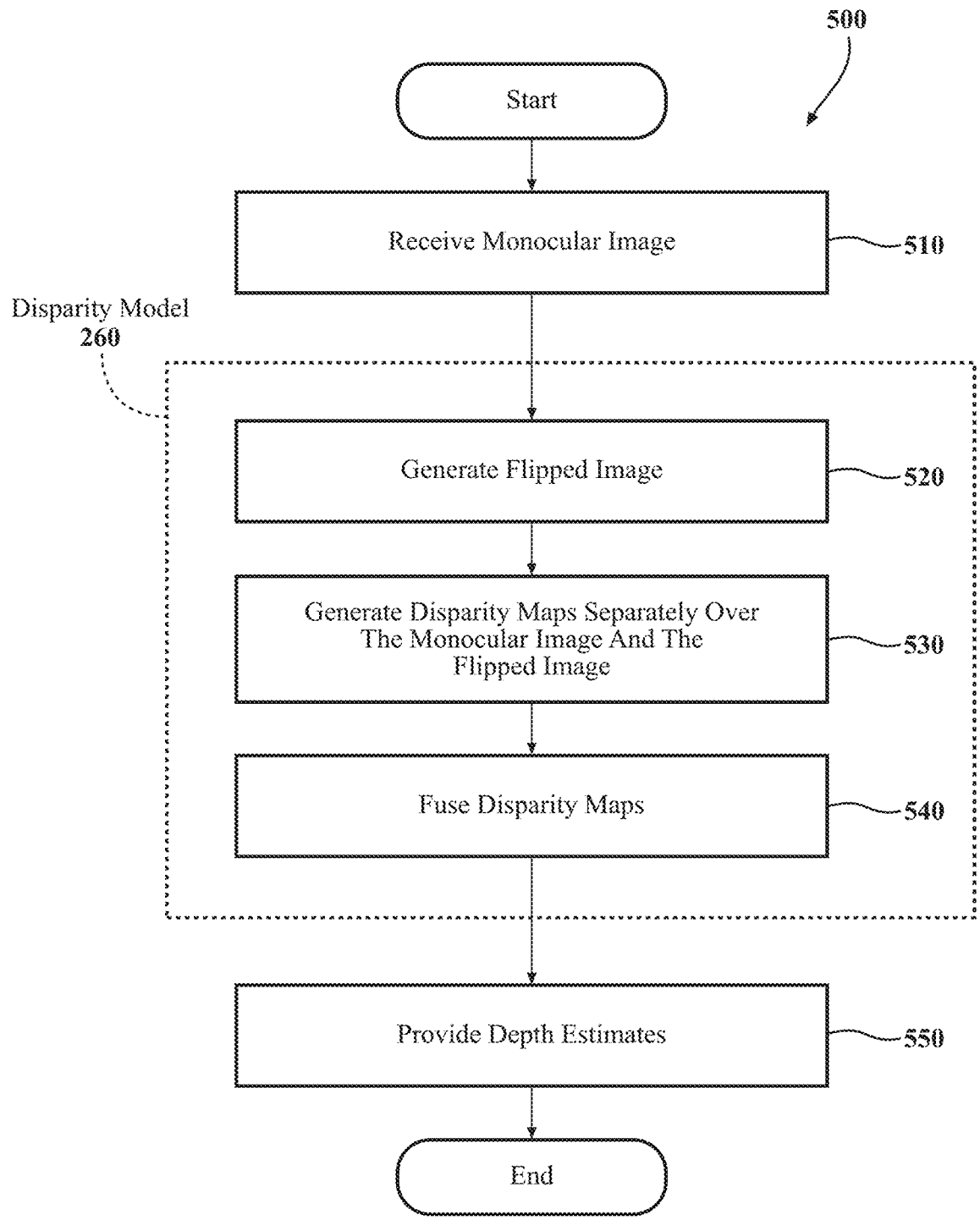
FIG. 5 illustrates a flowchart of one embodiment of a method associated with estimating depths within a surrounding environment from a monocular image.

Additional aspects of generating depth estimates from monocular images will be discussed in relation to FIG. 5. FIG. 5 illustrates a flowchart of a method 500 that is associated with using a disparity model including at least a flip layer to estimate depths from a single monocular image. Method 500 will be discussed from the perspective of the depth system 170 of FIGS. 1-2. While method 500 is discussed in combination with the depth system 170, it should be appreciated that the method 500 is not limited to being implemented within the depth system 170 but is instead one example of a system that may implement the method 500.

At 510, the image module 230 acquires the monocular image 250. In one embodiment, the image module 230 acquires the image 250 locally from collocated systems with the depth system 170 (e.g., the camera 126), while in further embodiments, the image module 230 may acquire the image 250 through a communication link with a remote system. Thus, while the depth system 170 can be implemented within a particular device that is, for example, actively navigating an environment, the depth system 170 may also function as a cloud-based computing service to analyze monocular images for depth information.

As previously described, the monocular image 250 itself may have different characteristics according to different implementations but generally is a single image that does not include explicit depth information. Of course, as previously explained, the self-supervised training process does involve using pairs of stereo images; however, the pairs of stereo images are stereo in the sense of being paired with a matching image and do not themselves include depth information either. As an additional note, the method 500 is illustrated with a bounding box around boxes 520, 530, and 540 that indicates which aspects of the method are, in one embodiment, being performed by the disparity model 260. That is, the bounding box indicates which functions are internal functions of the model 260 and, thus, which functions are subject to the training process discussed subsequently in relation to FIG. 6.

At 520, the disparity module 220 applies the flip layer of the disparity model 260 to flip the monocular image 250 and generate a flipped image. In one embodiment, the disparity module 220 executes the disparity model 260 according to a transformation embodied in the flip layer to horizontally flip the monocular image 250 by swapping pixels about a vertical centerline of the monocular image 250. Thus, the resulting flipped image is a mirrored copy of the monocular image 250. By providing the original monocular image 250 and flipped image, the disparity module 220 improves a resulting fused disparity map 270 by, for example, avoiding shadow regions near boundaries of the map 270 that may be caused by occlusions.

At 530, the disparity module 220 separately analyzes the flipped image and the monocular image 250 to generate corresponding disparity maps. In one embodiment, the disparity module 220 uses the disparity model 260 to generate a monocular map corresponding to the monocular image 250 and a flipped map corresponding with the flipped image. The disparity module 220 uses the disparity model 260 to generate the disparity maps by synthesizing the disparity maps in a high-resolution form from corresponding low-resolution intermediate outputs. For example, the disparity model 260 includes sub-pixel convolutional layers that iteratively transform the intermediate outputs until achieving a target depth resolution for the disparity maps that match the monocular image 250. The sub-pixel convolutional layers include learned convolutional features in addition to skip connections to activation blocks in the encoder 320 that provide for synthesizing high-resolution disparity maps.

In other words, the sub-pixel convolutional transformations executed by the sub-pixel layers are multiple upscaling layers in the disparity model 260 that super-resolve high-resolution data from multi-scale low-resolution convolutional features learned by the disparity model 260. Accordingly, the disparity model 260 performs, in one embodiment, the same set of actions over both the flipped image and the monocular image to provide two separate disparity maps having high-resolution equivalents to the input images.

At 540, the disparity module 220 applies the disparity model 260 to generate the fused disparity map 270 from the monocular map and the flipped map. In one embodiment, the disparity module 220 generates the fused disparity map 270 by reverting the flipped map to provide a re-flipped map and merging the re-flipped map with the monocular disparity map. In one approach, the disparity module 220 horizontally flips pixels of the flipped map using a pixel transformation to match original locations corresponding with the monocular image. As a result, the re-flipped map and the monocular map match objects/surface/locations depicted in the monocular image while avoiding difficulties encountered when processing the monocular image 250 alone through a single forward pass of the model 260. Thus, in one embodiment, the disparity module 220 generates the fused disparity map 270 by averaging pixels between the monocular map and the re-flipped map in a pixel-wise manner to provide a combined output in the form of the map 270.

At 550, the image module 230 provides the fused disparity map 270 as the depth estimates of objects represented in the monocular image 250. As should be appreciated, in one embodiment, the image module 230 electronically provides map 270 to other systems of the vehicle 100 in support of, for example, autonomous planning and navigation of the vehicle 100. Of course, in further implementations, the image module 230 communicates the map 270 to a remote device that originally provides the image 250 as a response to an original request for depth information. In general, the depth system 170 and the disparity model 260 can be employed in various contexts whether in support of active autonomous navigation, scene analysis, metadata analysis (e.g., traffic analysis), and so on. In either case, the approach embodied within the depth system 170 provides a unique and improved approach to leveraging monocular images in order to resolve high-resolution depth data.

Figure 6:
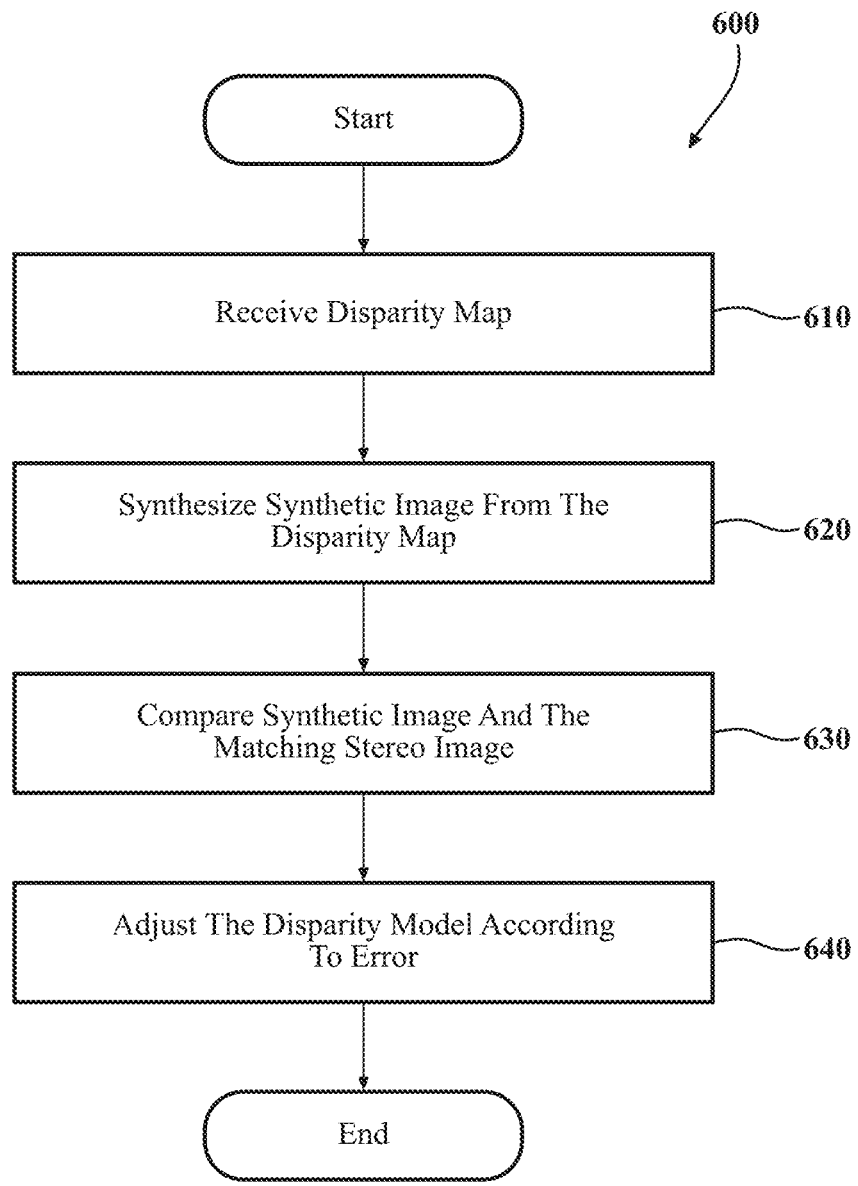
FIG. 6 illustrates a flowchart of one embodiment of a method associated with training a disparity model using a self-supervised training process.

FIG. 6 illustrates a flowchart of a method 600 that is associated with training the disparity model using a self-supervised process. Method 600 will be discussed from the perspective of the depth system 170 of FIG. 2. While method 600 is discussed in combination with the depth system 170 and the vehicle 100, it should be appreciated that the method 600 is not limited to being implemented within the depth system 170 or with the vehicle 100 but is instead one example of a system that may implement the method 600.

At 610, the image module 230 receives the disparity map 270. It should be appreciated that as a general approach to training the model 260, the system 170 generally executes the model 260 in an intended fashion as though the model 260 is processing "live" data; however, the training process generally provides known information (e.g., pairs of stereo images) and additional processing in order to assess the performance of the model 260 and adjust the model 260 to iteratively improve operation. As such, the disparity map 270 is provided as an initial input into the training process after the execution of the method 500 over one of the images of a training pair (e.g., a left image).

The training data, which is comprised of stereo images (i.e., pairs of monocular images from a stereo camera), facilitates the training by providing a point of comparison through the corresponding image that is not analyzed. That is, for a pair of monocular images that comprise the stereo images, a left image may be provided into the disparity model 260 to produce the map 270, while the right image of the pair is reserved for subsequent comparison. In this way, the depth system 170 can self-supervise the training process by using the reserved/matching image as a point of comparison against the output of the model 260.

At 620, the image module 230 synthesizes a synthetic stereo image (e.g., right synthetic image) from the fused disparity map 270 and the monocular image (e.g., left monocular image). In one embodiment, the synthetic image is a synthetic version of the reserved/matching image (e.g., right image). Thus, the image module 230 generates the synthetic image from the map 270 using, for example, a pixel-wise warping of image intensity values from one image to another using the disparity as a guide. The particular form of the generative network may vary according to the implementation but generally functions by accepting the model 270 as an input along with the left monocular image, and generating the synthetic image according to learned correlations between disparity maps and stereo images. In either case, the generative network is configured to produce an image that is a prediction of the matching image from the stereo pair.

At 630, the image module 230 compares the synthetic image and the original/matching stereo image to determine an error therebetween. As previously discussed, in one embodiment, the error is embodied as a photometric loss between the images that is comprised of an appearance matching loss, a disparity smoothness loss, and an occlusion regularization loss. Thus, the noted loss functions characterize the differences between the images in order to assess how well the disparity model 260 estimates the depths as provided in the disparity map 270.

At 640, the image module 230 adjusts the disparity model 260 according to the error as embodied in the photometric loss between the synthetic image and the matching stereo image. In one embodiment, the image module 230 selectively adjusts hyper-parameters within the model 260 according to values acquired for the loss function. It should be noted, because the architecture of the model 260 is inclusive of the differentiable flip-augmentation layer and the sub-pixel convolutional layers, training the model 260 includes training the differentiable flip-augmentation layer and the sub-pixel convolutional layers thereby providing for a fine-tuned approach that is adaptive to the training approach. In this way, the depth system 170 not only provides a network architecture that improves the resolution and occurrences of artifacts in the map 270 but also the process by which the model 260 is trained.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The terrain maps 117 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles.

The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the image module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined (e.g., planned) driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for generating depth estimates from a monocular image, comprising:
   one or more processors;
   a memory communicably coupled to the one or more processors and storing:
   a disparity module including instructions that when executed by the one or more processors cause the one or more processors to:
      flip, using a disparity model, the monocular image to generate a flipped image, wherein the disparity model is a machine learning algorithm,
      analyze, using the disparity model, the monocular image and the flipped image to generate disparity maps including a monocular disparity map corresponding to the monocular image and a flipped disparity map corresponding to the flipped image,
      generate, in the disparity model, a fused disparity map from the monocular disparity map and the flipped disparity map,
      wherein the instructions to generate the fused disparity map includes combining pixels between the monocular map and a re-flipped map to provide a combined output, the re-flipped map is horizontally flipped from the flipped disparity map; and
   an image module including instructions that when executed by the one or more processors cause the one or more processors to provide the fused disparity map as the depth estimates of objects represented in the monocular image.

2. The depth system of claim 1, wherein the disparity module includes instructions to flip the monocular image including instructions to horizontally flip the monocular image by swapping pixels about a vertical centerline of the monocular image to generate the flipped image as a mirrored copy of the monocular image, and wherein the disparity module includes instructions to flip the monocular image using an internal transformation of the disparity model.

3. The depth system of claim 1, wherein the disparity module includes instructions to analyze the monocular image and the flipped image including instructions to analyze the monocular image and the flipped image over separate iterations of a forward pass of the disparity model to independently generate the monocular disparity map and the flipped disparity map, and wherein the depth estimates embodied in the fused disparity map indicate relative distances of the objects from a point of reference of a camera that generated the monocular image.

4. The depth system of claim 1, wherein the disparity module includes instructions to generate the fused disparity map including instructions to revert the flipped disparity map to provide a re-flipped disparity map by horizontally flipping pixels of the flipped disparity map to match original locations corresponding to the monocular disparity map.

5. The depth system of claim 1, wherein the disparity module includes instructions to analyze the monocular image and the flipped image to generate the monocular disparity map and the flipped disparity map including instructions to synthesize the monocular disparity map and the flipped disparity map in a high-resolution format from corresponding low-resolution intermediate outputs within the disparity model using sub-pixel convolutional transformations on the intermediate outputs until achieving a target depth resolution for the disparity maps that match the monocular image.

6. The depth system of claim 5, wherein the sub-pixel convolutional transformations include multiple upscaling layers in the disparity model to super-resolve high resolution data from low-resolution convolutional features learned by the disparity model.

7. The depth system of claim 1, wherein the image module includes instructions to train the disparity model using a self-supervised process that adjusts the disparity model according to a photometric loss between a synthetic stereo image and a matching stereo image related to the monocular image as a pair of stereo images, the synthetic stereo image being derived from at least the fused disparity map, wherein the image module includes instructions to train including instructions to adjust parameters in the disparity model that control implementation of the instructions to flip, analyze, and generate to produce the fused disparity map.

8. The depth system of claim 7, wherein the image module includes instructions to train the disparity model including instructions to:

i) synthesize the synthetic stereo image from the fused disparity map to correspond with the matching stereo image, wherein the pair of stereo images is formed from the monocular image and the matching image that are opposing right and left images in the pair, and wherein the synthetic stereo image is synthetically generated as an opposing image to the monocular image in the pair to correspond with the matching image, and ii) compare the synthetic stereo image and the matching stereo image to determine the photometric loss.

9. A non-transitory computer-readable medium for generating depth estimates from a monocular image and including instructions that when executed by one or more processors cause the one or more processors to:

flip, using a disparity model, the monocular image to generate a flipped image, wherein the disparity model is a machine learning algorithm;

analyze, using the disparity model, the monocular image and the flipped image to generate disparity maps including a monocular disparity map corresponding to the monocular image and a flipped disparity map corresponding with the flipped image;

generate, using the disparity model, a fused disparity map from the monocular disparity map and the flipped disparity map;

wherein the instructions to generate the fused disparity map includes combining pixels between the monocular map and a re-flipped map to provide a combined output, the re-flipped map is horizontally flipped from the flipped disparity map; and provide the fused disparity map as the depth estimates of objects represented in the monocular image.

10. The non-transitory computer-readable medium of claim 9, wherein the instructions to flip the monocular image include instructions to horizontally flip the monocular image by swapping pixels about a vertical centerline of the monocular image to generate the flipped image as a mirrored copy of the monocular image, and wherein the instructions to flip the monocular image include instructions to use an internal transformation of the disparity model to perform the flip.

11. The non-transitory computer-readable medium of claim 9, wherein the instructions to analyze the monocular image and the flipped image include instructions to analyze the monocular image and the flipped image over separate iterations of a forward pass of the disparity model to independently generate the monocular map and the flipped map, and wherein the depth estimates embodied in the fused disparity map indicate relative distances of the objects from a point of reference of a camera that generated the monocular image.

12. The non-transitory computer-readable medium of claim 9, wherein the instructions to generate the fused disparity map include instructions to revert the flipped disparity map to provide a re-flipped disparity map by horizontally flipping pixels of the flipped map to match original locations corresponding to the monocular disparity map.

13. The non-transitory computer-readable medium of claim 9, wherein the instructions to analyze the monocular image and the flipped image to generate the monocular disparity map and the flipped disparity map include instructions to synthesize the monocular disparity map and the flipped disparity map in a high-resolution format from corresponding low-resolution intermediate outputs within the disparity model using sub-pixel convolutional transformations on the intermediate outputs until achieving a target depth resolution for the disparity maps that match the monocular image.

14. A method of generating depth estimates from a monocular image, comprising:

in response to receiving the monocular image, flipping, by a disparity model, the monocular image to generate a flipped image, wherein the disparity model is a machine learning algorithm;

analyzing, using the disparity model, the monocular image and the flipped image to generate disparity maps including a monocular disparity map corresponding to the monocular image and a flipped disparity map corresponding with the flipped image;

generating, in the disparity model, a fused disparity map from the monocular disparity map and the flipped disparity map, wherein generating the fused disparity map includes combining pixels between the monocular map and a re-flipped map to provide a combined output, the re-flipped map is horizontally flipped from the flipped disparity map; and providing the fused disparity map as the depth estimates of objects represented in the monocular image.

15. The method of claim 14, wherein flipping the monocular image includes horizontally flipping the monocular image by swapping pixels about a vertical centerline of the monocular image to generate the flipped image as a mirrored copy of the monocular image, and wherein flipping the monocular image is an internal transformation of the disparity model.

16. The method of claim 14, wherein analyzing the monocular image and the flipped image includes analyzing the monocular image and the flipped image over separate iterations of a forward pass of the disparity model to independently generate the monocular map and the flipped map, and wherein the depth estimates embodied in the fused disparity map indicate relative distances of the objects from a point of reference of a camera that generated the monocular image.

17. The method of claim 14, wherein generating the fused disparity map includes reverting the flipped disparity map to provide a re-flipped disparity map by horizontally flipping pixels of the flipped disparity map to match original locations corresponding to the monocular disparity map.

18. The method of claim 14, wherein analyzing the monocular image and the flipped image to generate the monocular disparity map and the flipped disparity map includes synthesizing the monocular disparity map and the flipped disparity map in a high-resolution form from corresponding low-resolution intermediate outputs within the disparity model using sub-pixel convolutional transformations until achieving a target depth resolution for the monocular disparity map and the flipped disparity map that match the monocular image.

19. The method of claim 18, wherein the sub-pixel convolutional transformations include multiple upscaling layers in the disparity model to super-resolve high resolution data from low-resolution convolutional features learned by the disparity model.

20. The method of claim 14, further comprising:

training the disparity model using a self-supervised process that adjusts the disparity model according to a photometric loss between a synthetic stereo image and a matching stereo image that form a pair of stereo images as opposing right and left images in the pair, and wherein the synthetic stereo image is synthetically generated as an opposing image to the monocular image in the pair to correspond with the matching image, wherein training includes adjusting parameters in the disparity model that control the flipping, analyzing, and generating to produce the fused disparity map.

* * * * *